(12) United States Patent
Quach et al.

(10) Patent No.: US 11,156,101 B2
(45) Date of Patent: Oct. 26, 2021

(54) AIRFOIL TIP POCKET WITH AUGMENTATION FEATURES

(71) Applicant: United Technologies Corporation, Farmington, CT (US)

(72) Inventors: San Quach, East Hartford, CT (US); Tracy A. Propheter-Hinckley, Manchester, CT (US); Steven Bruce Gautschi, Naugatuck, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/858,955

(22) Filed: Apr. 27, 2020

(65) Prior Publication Data

US 2020/0291793 A1 Sep. 17, 2020

Related U.S. Application Data

(63) Continuation of application No. 15/995,884, filed on Jun. 1, 2018, now Pat. No. 10,633,981, which is a continuation of application No. 14/704,022, filed on May 5, 2015, now Pat. No. 10,012,089.

(60) Provisional application No. 61/994,270, filed on May 16, 2014.

(51) Int. Cl.
*F01D 5/18* (2006.01)
*F01D 5/14* (2006.01)
*F01D 5/20* (2006.01)

(52) U.S. Cl.
CPC ............. *F01D 5/187* (2013.01); *F01D 5/147* (2013.01); *F01D 5/186* (2013.01); *F01D 5/20* (2013.01); *F05D 2220/32* (2013.01); *F05D 2260/202* (2013.01); *F05D 2260/221* (2013.01); *F05D 2260/2212* (2013.01);
(Continued)

(58) Field of Classification Search
CPC . F01D 5/20; F01D 5/187; F01D 5/147; F01D 5/186
See application file for complete search history.

(56) References Cited

U.S. PATENT DOCUMENTS 7,537,431 B1 5/2009 Liang
8,011,889 B1 9/2011 Liang
8,435,004 B1 5/2013 Liang
(Continued)

FOREIGN PATENT DOCUMENTS

DE 19963375 7/2001
EP 2666967 11/2013
(Continued)

OTHER PUBLICATIONS

Extended European Search Report for Application No. EP 15 00 1485 dated Sep. 18, 2015.

*Primary Examiner* — Woody A Lee, Jr.
*Assistant Examiner* — Sabbir Hasan
(74) *Attorney, Agent, or Firm* — Carlson, Gaskey & Olds, P.C.

(57) ABSTRACT

A component for a gas turbine engine includes, among other things, an airfoil that includes a pressure sidewall and a suction sidewall that meet together at both a leading edge and a trailing edge, the airfoil extending radially from a platform to a tip, a tip pocket formed in the tip and terminating prior to the trailing edge, and one or more heat transfer augmentation devices formed in the tip pocket.

20 Claims, 9 Drawing Sheets

(52) U.S. Cl.
CPC .............. *F05D 2260/2214* (2013.01); *F05D 2260/22141* (2013.01); *Y02T 50/60* (2013.01)

(56) References Cited

U.S. PATENT DOCUMENTS

| | | | |
|---|---|---|---|
| 8,512,003 B2 | 8/2013 | Klasing et al. | |
| 8,647,071 B2 | 2/2014 | Pons et al. | |
| 8,738,491 B1 | 5/2014 | Pettay | |
| 9,045,988 B2* | 6/2015 | Mishra | F01D 5/20 |
| 2003/0021684 A1 | 1/2003 | Downs et al. | |
| 2008/0044289 A1 | 2/2008 | Klasing et al. | |
| 2010/0111704 A1 | 5/2010 | Hada | |
| 2011/0123350 A1 | 5/2011 | Pons | |
| 2012/0076653 A1 | 3/2012 | Beeck et al. | |
| 2013/0266454 A1 | 10/2013 | Mongillo, Jr. et al. | |
| 2014/0030101 A1 | 1/2014 | Mishra et al. | |
| 2014/0030102 A1* | 1/2014 | Mishra | F01D 5/20 |
| | | | 416/223 R |
| 2014/0047842 A1 | 2/2014 | Chius et al. | |
| 2014/0099139 A1 | 4/2014 | Kojima | |

FOREIGN PATENT DOCUMENTS

| | | | |
|---|---|---|---|
| EP | 2666968 | 11/2013 | |
| WO | 2010/010284 | 1/2010 | |
| WO | WO-2010010284 A1 * | 1/2010 | ............ F01D 5/20 |
| WO | 2015/069411 | 5/2015 | |

\* cited by examiner

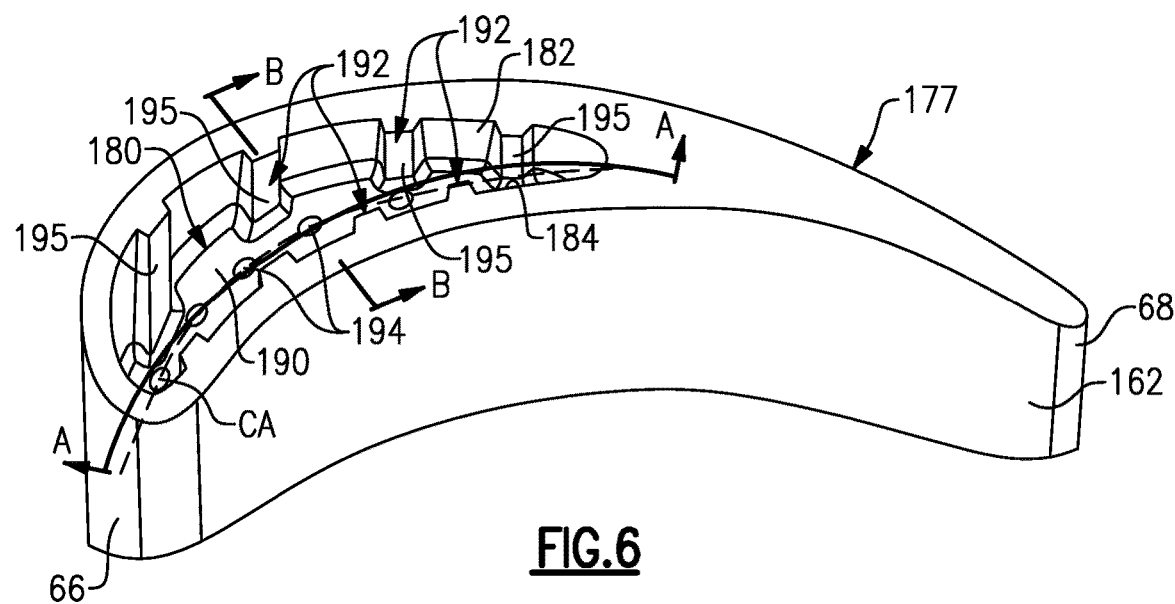
FIG.6
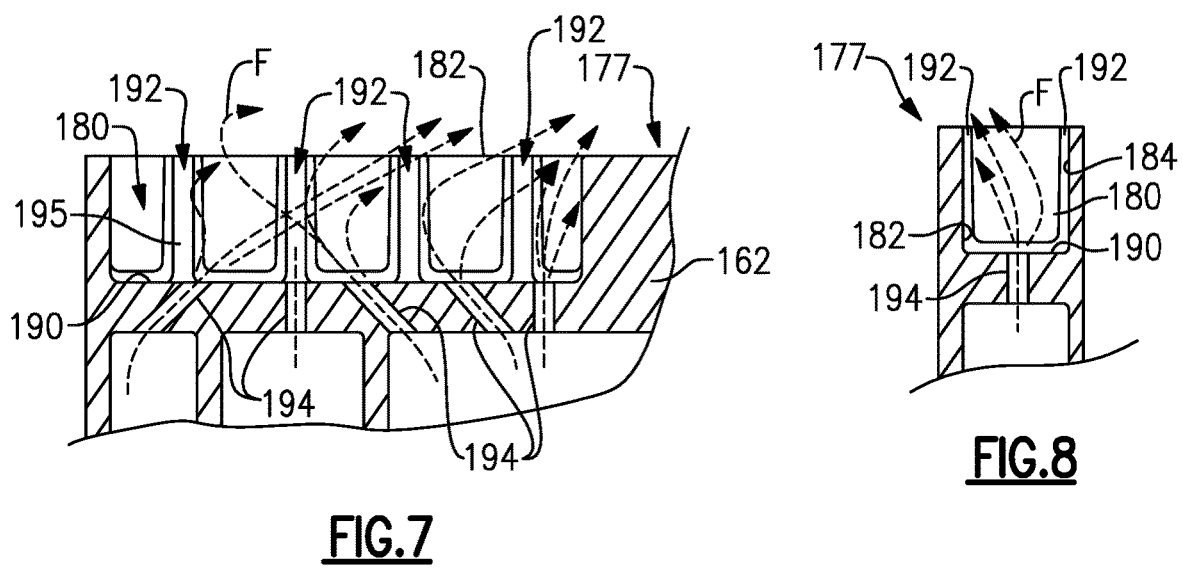
FIG.7
FIG.8

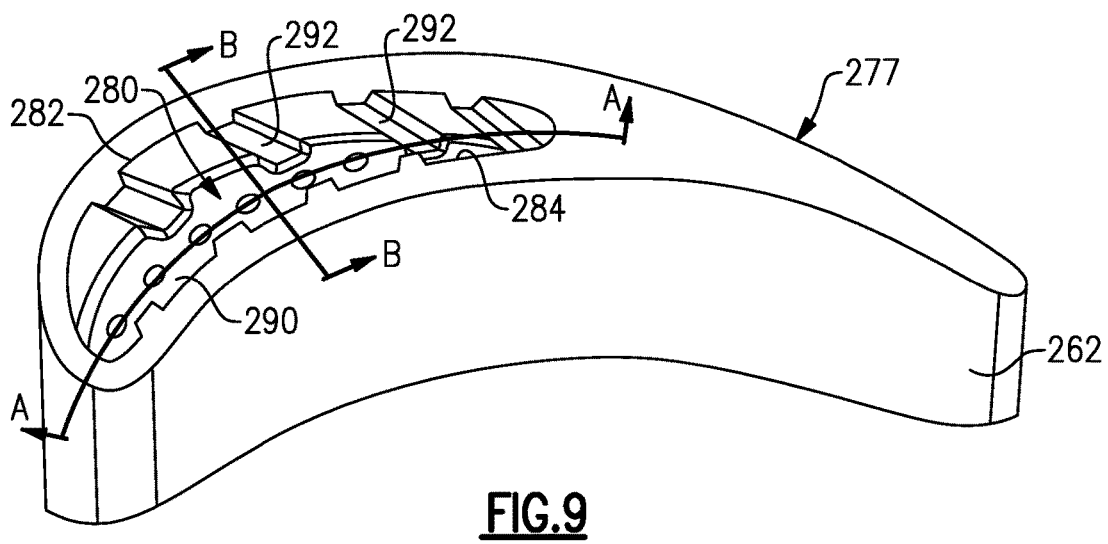
FIG. 9
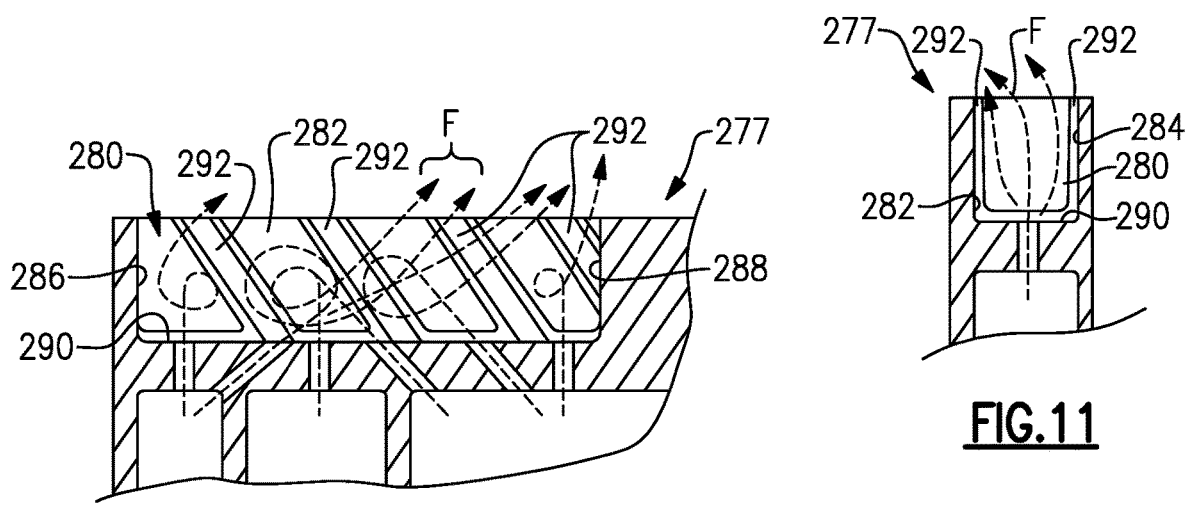
FIG. 10
FIG. 11

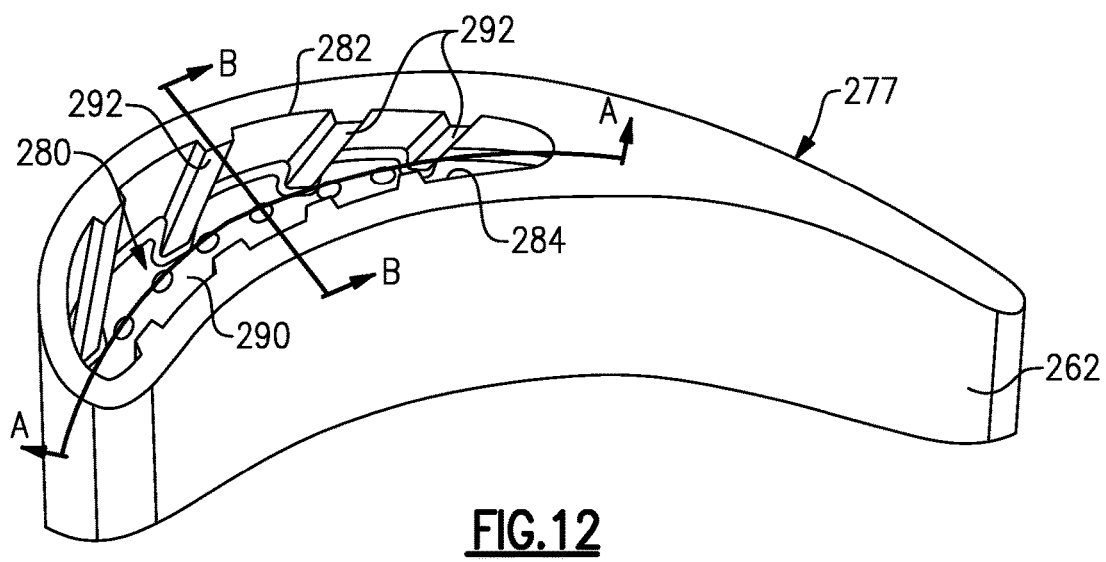
FIG. 12
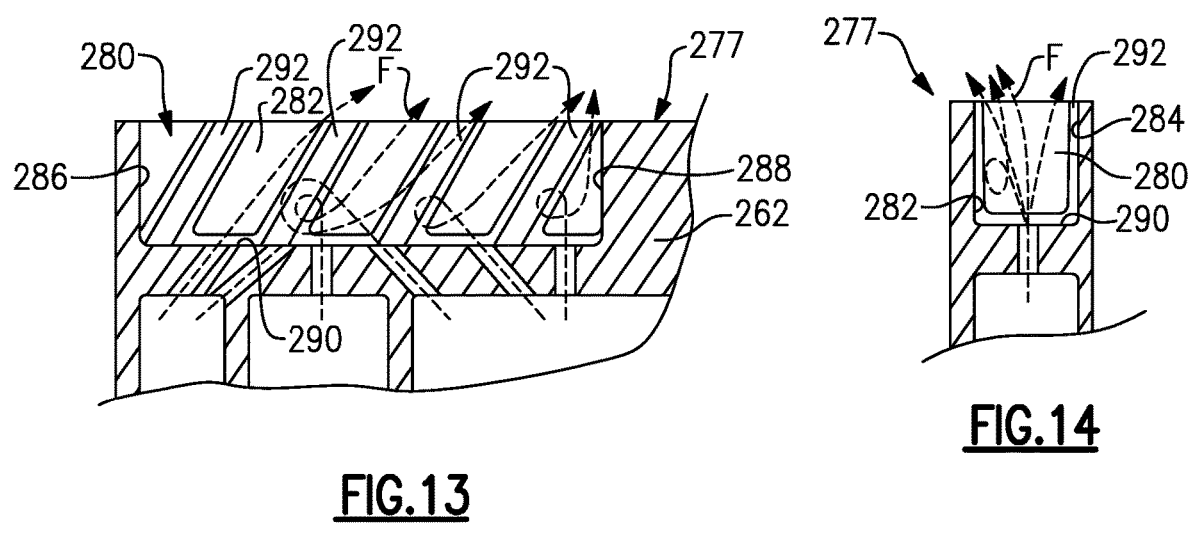
FIG. 13
FIG. 14

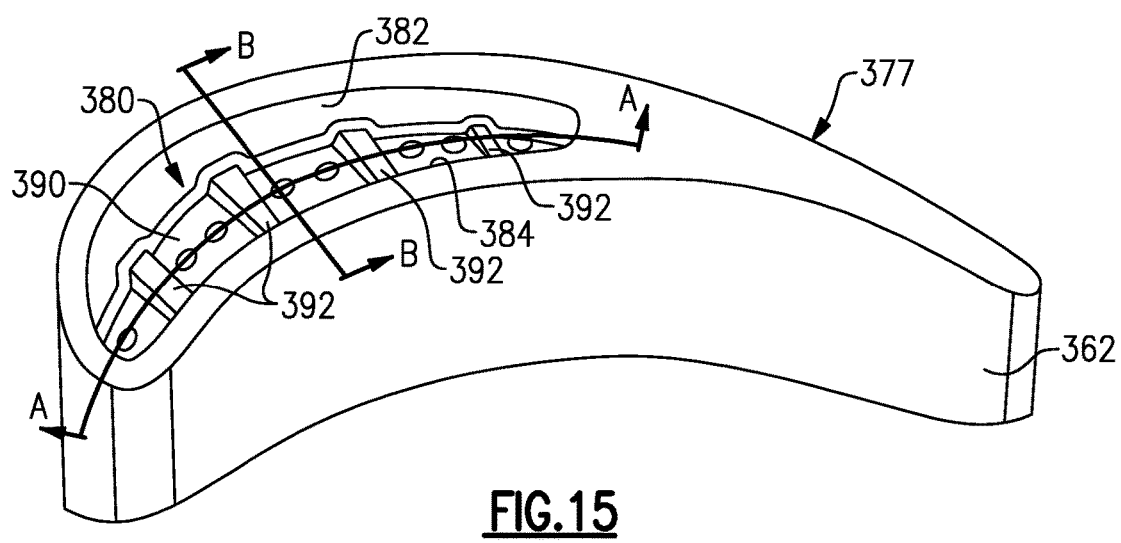
FIG. 15
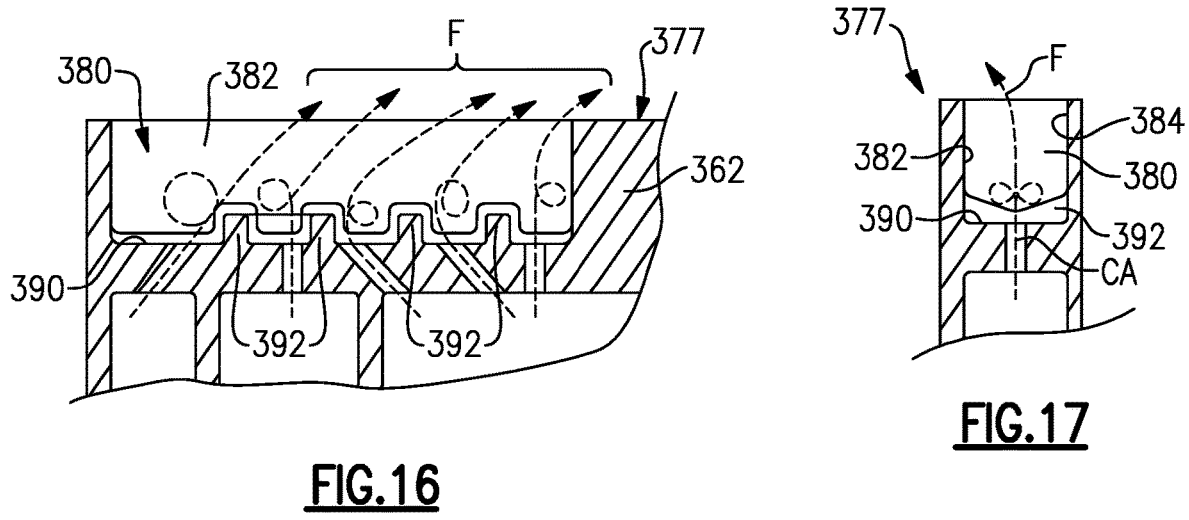
FIG. 16
FIG. 17

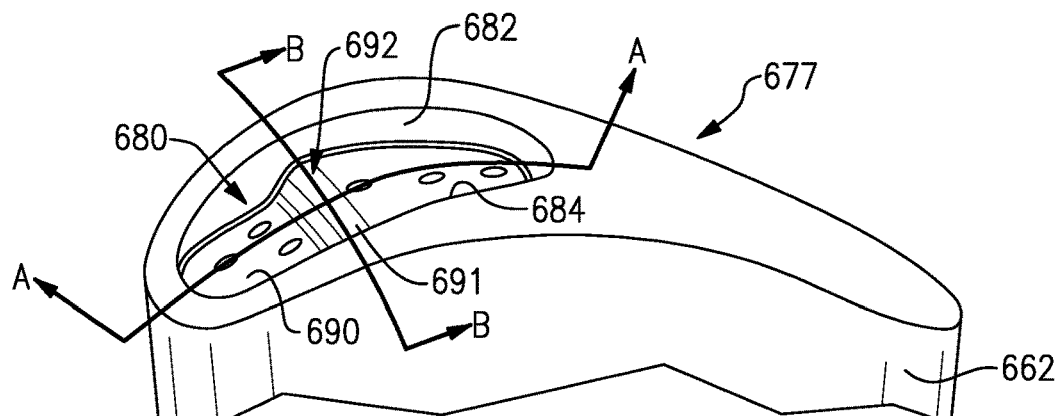
FIG.21
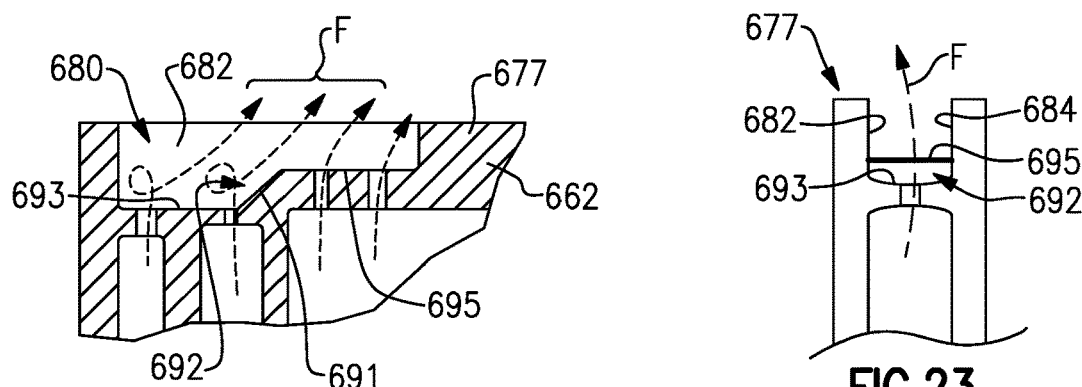
FIG.22
FIG.23
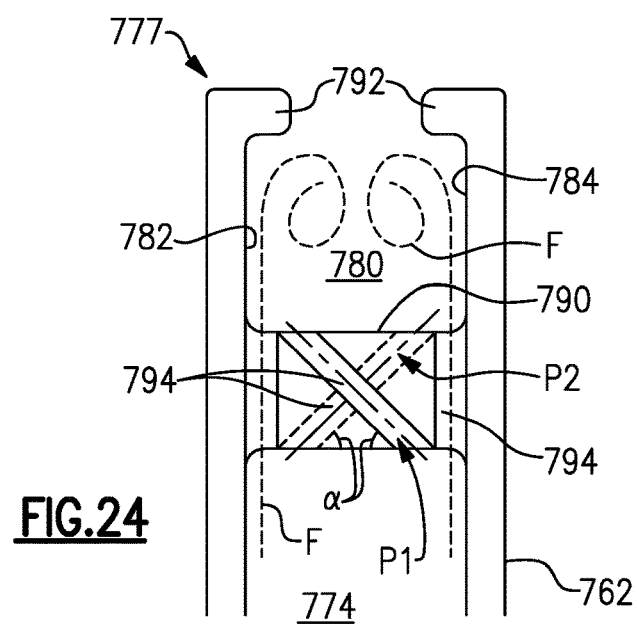
FIG.24

AIRFOIL TIP POCKET WITH AUGMENTATION FEATURES

CROSS REFERENCE TO RELATED APPLICATION

This application is a continuation of U.S. patent application Ser. No. 15/995,884, filed on Jun. 1, 2018, which is a continuation of U.S. patent application Ser. No. 14/704,022, filed on May 5, 2015, which claims priority to U.S. Provisional Application No. 61/994,270, filed on May 16, 2014.

STATEMENT REGARDING FEDERALLY SPONSORED RESEARCH OR DEVELOPMENT

This invention was made with government support under Contract No. N68335-13-C-0005, awarded by the United States Navy. The Government therefore has certain rights in this invention.

BACKGROUND

This disclosure relates to a gas turbine engine, and more particularly to a gas turbine engine component having an airfoil that includes a tip pocket. The tip pocket may employ one or more heat transfer augmentation devices.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Because they are commonly exposed to hot combustion gases, many gas turbine engine components, such as blades and vanes, employ cooling circuits that channel dedicated cooling fluids for cooling the component. It can be difficult to communicate enough cooling fluid to cool airfoil tips of the components. This may lead to airfoil tip burning.

SUMMARY

A component according to an exemplary aspect of the present disclosure includes, among other things, an airfoil that includes a pressure sidewall and a suction sidewall that meet together at both a leading edge and a trailing edge. The airfoil extends to a tip. A tip pocket is formed in the tip and terminates prior to the trailing edge. A heat transfer augmentation device is formed in the tip pocket.

In a further non-limiting embodiment of the foregoing component, the tip pocket includes a suction side lip, a pressure side lip, a leading edge lip and a trailing edge lip that extend radially outwardly from a floor.

In a further non-limiting embodiment of either of the foregoing components, the heat transfer augmentation device axially extends across at least one of the suction side lip and the pressure side lip.

In a further non-limiting embodiment of any of the foregoing components, the heat transfer augmentation device extends from the leading edge lip to the trailing edge lip.

In a further non-limiting embodiment of any of the foregoing components, the heat transfer augmentation device extends radially outwardly from the floor across at least one of the suction side lip and the pressure side lip.

In a further non-limiting embodiment of any of the foregoing components, the heat transfer augmentation device is slanted toward either the leading edge lip or the trailing edge lip.

In a further non-limiting embodiment of any of the foregoing components, the heat transfer augmentation device is formed on the floor and extends between the suction side lip and the pressure side lip.

In a further non-limiting embodiment of any of the foregoing components, the heat transfer augmentation device is tapered.

In a further non-limiting embodiment of any of the foregoing components, the heat transfer augmentation device is a chevron or a trip strip.

In a further non-limiting embodiment of any of the foregoing components, the heat transfer augmentation device is formed on a suction side lip of the tip pocket and a second heat transfer augmentation device is formed on a pressure side lip of the tip pocket.

In a further non-limiting embodiment of any of the foregoing components, a third heat transfer augmentation device is formed on a floor of the tip pocket.

In a further non-limiting embodiment of any of the foregoing components, a plurality of cooling holes fluidly connect the tip pocket to at least one internal cooling cavity formed inside the airfoil.

In a further non-limiting embodiment of any of the foregoing components, the plurality of cooling holes are positioned relative to a central axis of the tip pocket, and a wall of the heat transfer augmentation device terminates prior to intersecting the central axis.

In a further non-limiting embodiment of any of the foregoing components, at least one of the plurality of cooling holes is angled relative to a floor of the tip pocket.

In a further non-limiting embodiment of any of the foregoing components, the heat transfer augmentation device is slanted at an angle relative to a floor of the tip pocket.

In a further non-limiting embodiment of any of the foregoing components, the heat transfer augmentation device includes a ramp that divides a floor of the tip pocket into radially offset floor portions.

A gas turbine engine according to another exemplary aspect of the present disclosure includes, among other things, an airfoil including a tip pocket formed at a tip of the airfoil. The tip pocket extends from a position near a leading edge of the airfoil to a position that is upstream from a trailing edge of the airfoil. A plurality of heat transfer augmentation devices are formed in the tip pocket.

In a further non-limiting embodiment of the foregoing gas turbine engine, the tip pocket extends from a position near the leading edge to a position near a mid-span of the airfoil.

In a further non-limiting embodiment of either of the foregoing gas turbine engines, the plurality of heat transfer augmentation devices are formed on a floor of the tip pocket.

In a further non-limiting embodiment of any of the foregoing gas turbine engines, the plurality of heat transfer augmentation devices are formed on a suction side wall of the tip pocket.

In a further non-limiting embodiment of any of the foregoing gas turbine engines, the plurality of heat transfer augmentation devices are formed on a pressure side wall of the tip pocket.

In a further non-limiting embodiment of any of the foregoing gas turbine engines, the plurality of heat transfer augmentation devices are formed on at least two of a floor, a suction side wall and a pressure side wall of the tip pocket.

In a further non-limiting embodiment of any of the foregoing gas turbine engines, a cooling hole fluidly connects the tip pocket to at least one internal cooling cavity formed inside the airfoil. The plurality of heat transfer augmentation devices terminate prior to intersecting a central axis of the tip pocket.

In a further non-limiting embodiment of any of the foregoing gas turbine engines, the cooling hole is angled relative to a floor of the tip pocket.

In a further non-limiting embodiment of any of the foregoing gas turbine engines, the plurality of heat transfer augmentation devices are slanted at an angle relative to a floor of the tip pocket.

In a further non-limiting embodiment of any of the foregoing gas turbine engines, the plurality of heat transfer augmentation devices includes ramps that divide a floor of the tip pocket into radially offset floor portions.

A method of cooling a gas turbine engine component according to another exemplary aspect of the present disclosure includes, among other things, communicating a cooling fluid into a tip pocket formed at a tip of an airfoil, temporarily blocking the cooling fluid within the tip pocket with at least one heat transfer augmentation device, and expelling the cooling fluid from the tip pocket into a gas stream.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 6 illustrates a tip of an airfoil of a gas turbine engine component according to a second embodiment of this disclosure.

FIG. 7 illustrates a cross-sectional view through section A-A of FIG. 6.

FIG. 8 illustrates a cross-sectional view through section B-B of FIG. 6.

FIG. 9 illustrates a tip of an airfoil of a gas turbine engine component according to another embodiment of this disclosure.

FIG. 10 illustrates a cross-sectional view through section A-A of FIG. 9.

FIG. 11 illustrates a cross-sectional view through section B-B of FIG. 9.

FIG. 12 illustrates a tip of an airfoil of a gas turbine engine component according to yet another embodiment of this disclosure.

FIG. 13 illustrates a cross-sectional view through section A-A of FIG. 12.

FIG. 14 illustrates a cross-sectional view through section B-B of FIG. 12.

FIG. 15 illustrates a tip of an airfoil of a gas turbine engine component according to yet another embodiment of this disclosure.

FIG. 16 illustrates a cross-sectional view through section A-A of FIG. 15.

FIG. 17 illustrates a cross-sectional view through section B-B of FIG. 15.

FIG. 21 illustrates a tip of an airfoil of a gas turbine engine component according to yet another embodiment of this disclosure.

FIG. 22 illustrates a cross-sectional view through section A-A of FIG. 21.

FIG. 23 illustrates a cross-sectional view through section B-B of FIG. 21.

FIG. 24 illustrates a tip of an airfoil of a gas turbine engine component according to yet another embodiment of this disclosure.

DETAILED DESCRIPTION

This disclosure relates to a gas turbine engine component having an airfoil. A tip pocket is formed at a tip of the airfoil. The tip pocket may include one or more heat transfer augmentation devices, such as trip strips, chevrons, or the like, disposed within the tip pocket. The heat transfer augmentation devices may be formed on a suction or pressure side lip of the tip pocket, a floor of the tip pocket, or any combination of locations. These and various other features are discussed in greater detail herein.

Figure 1:
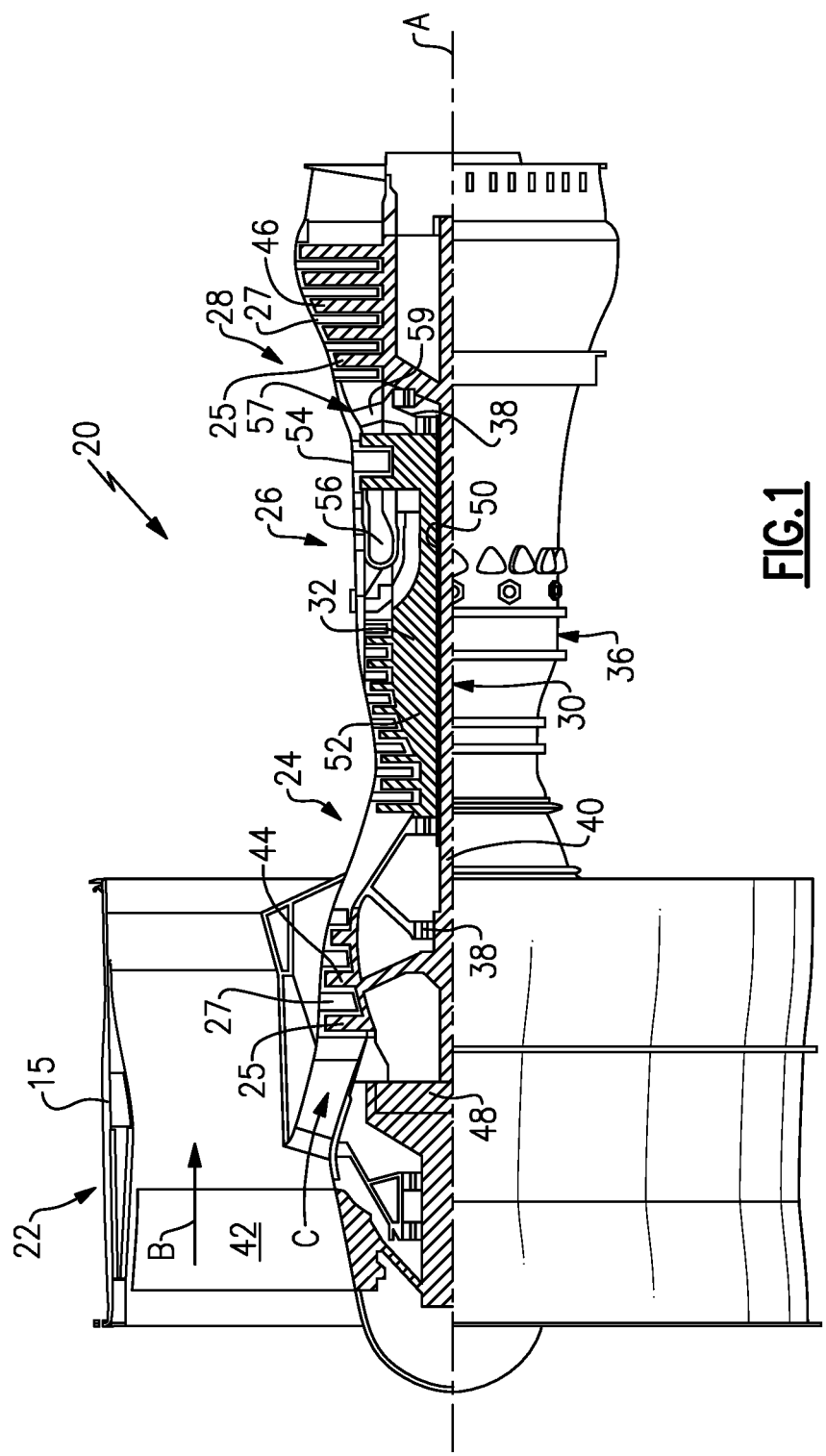
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of the bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via the bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans and turbo shafts.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1,150 ft/second (350.5 meters/second).

Each of the compressor section 24 and the turbine section 28 may include alternating rows of rotor assemblies and vane assemblies (shown schematically). For example, the rotor assemblies can carry a plurality of rotating blades 25, while each vane assembly can carry a plurality of vanes 27 that extend into the core flow path C. The blades 25 may either create or extract energy in the form of pressure from the core airflow as it is communicated along the core flow path C. The vanes 27 direct the core airflow to the blades 25 to either add or extract energy.

Figure 2:
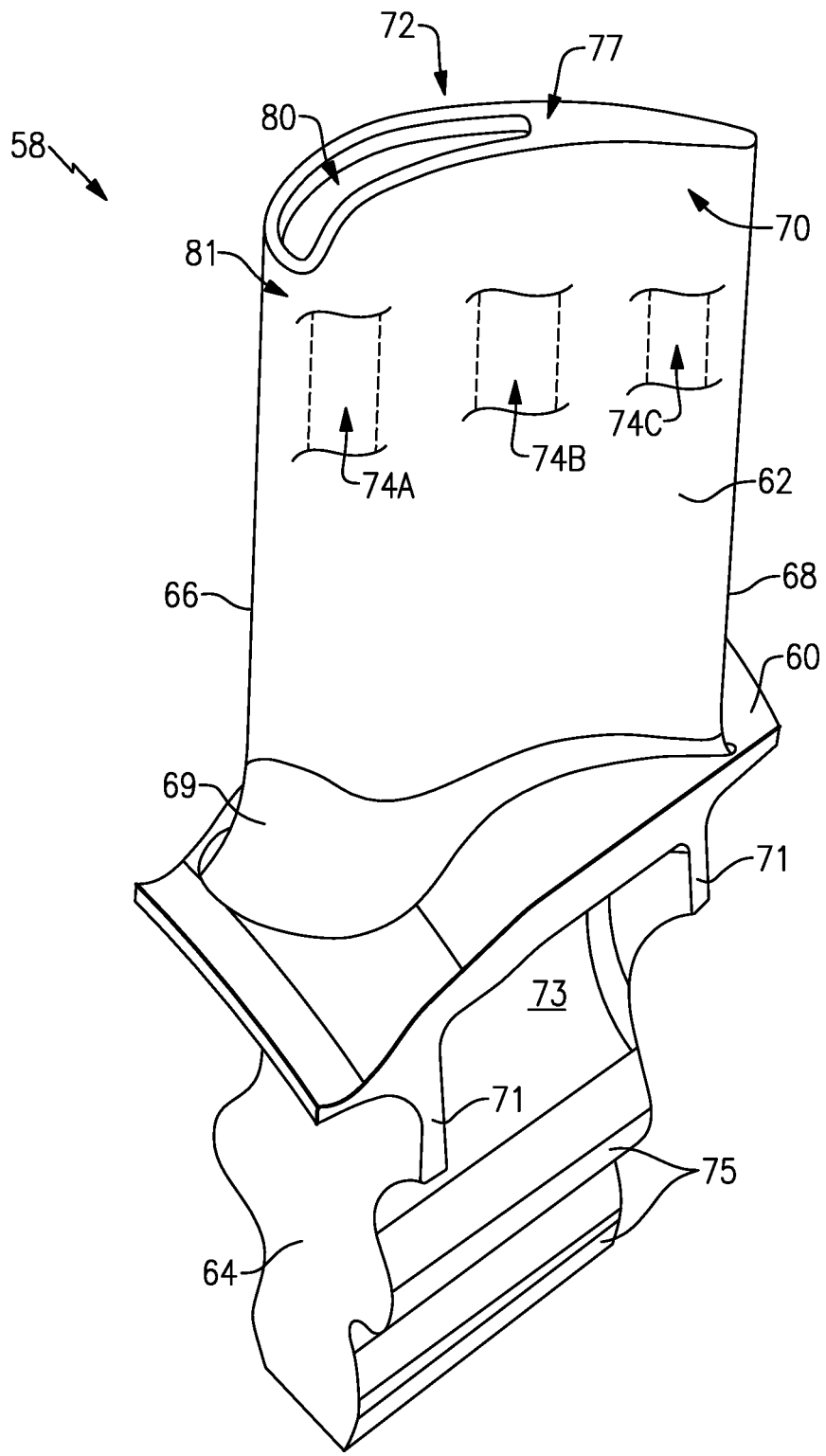
FIG. 2 illustrates a gas turbine engine component.

FIG. 2 illustrates a component 58 that can be employed for use within a gas turbine engine, such as the gas turbine engine 20 of FIG. 1. In one embodiment, the component 58 is a turbine blade. Although the component 58 is illustrated as turbine blade, the various features of this disclosure are applicable to other components located elsewhere within a gas turbine engine, such as vanes or compressor airfoils. Thus, some features that are particularly relevant to the illustrated turbine blade are to be considered optional and are not necessary to practice this disclosure.

In one embodiment, the component 58 includes a platform 60, an airfoil 62 that extends in a first direction from the platform 60, and a root 64 that extends in a second, opposite direction from the platform 60. The airfoil 62 includes a leading edge 66, a trailing edge 68, a pressure sidewall 70 and a suction sidewall 72. The pressure sidewall 70 and the suction sidewall 72 are spaced apart and generally meet together at both the leading edge 66 and the trailing edge 68.

The airfoil 62 connects to the platform 60 at a fillet 69. The root 64 connects to the platform 60 at buttresses 71. The root 64 may include a neck 73 and one or more serrations 75 for securing the component 58 to a disk (not shown).

Although shown schematically in FIG. 2, the component 58 may include multiple internal cooling cavities 74A, 74B and 74C. The internal cooling cavities 74A, 74B and 74C are core formed cavities that extend inside of the airfoil 62. The internal cooling cavities 74A, 74B and 74C may form part of an internal cooling circuit 81 for cooling the component 58. The exemplary internal cooling circuit 81 of the component 58 represents but one non-limiting example of the many potential cooling circuits that may be formed inside the component 58. In other words, the component 58 could be cast to include various alternative cooling cavities and internal circuitry configurations within the scope of this disclosure With reference to the engine 20 of FIG. 1, the airfoil 62 extends to a tip 77. The tip 77 can be referred to as the outer diameter portion of the component 58. The root 64 can be referred to as the inner diameter portion of the component 58.

A tip pocket 80 may be formed in the tip 77 of the airfoil 62. The tip pocket 80 may also be referred to as a squealer pocket. In one embodiment, the tip pocket 80 is part of the internal cooling circuit 81 of the component 58. As discussed in greater detail below, the tip pocket 80 introduces a cooling fluid at the tip 77 of the airfoil 62 to cool the tip 77 and avoid airfoil tip burning.

Figure 3:
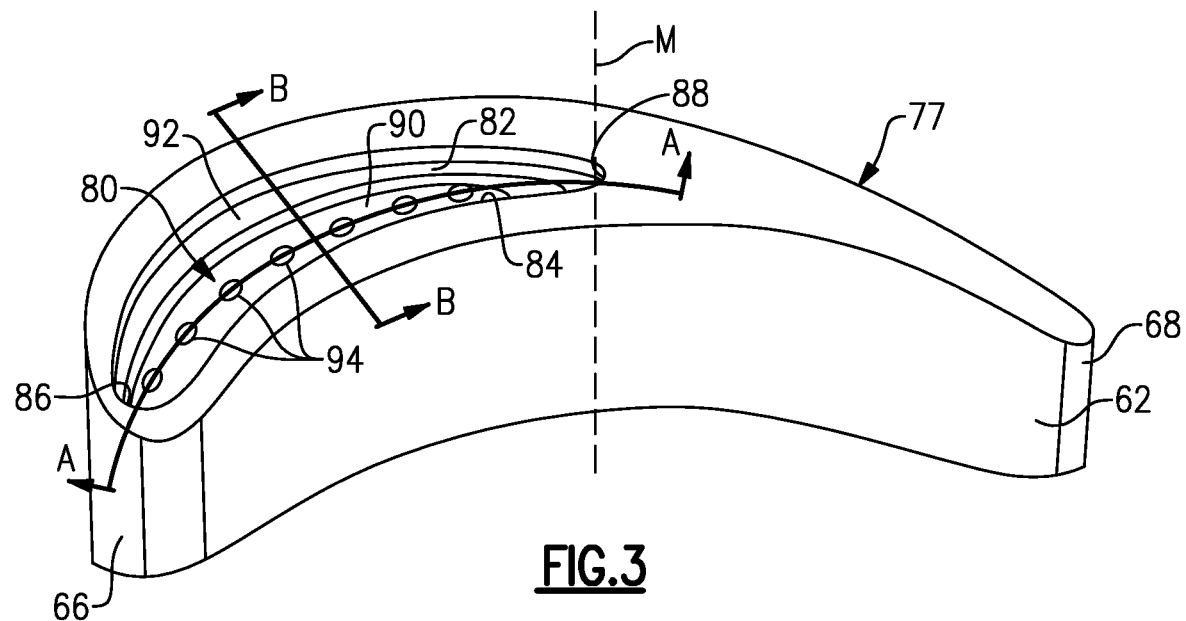
FIG. 3 illustrates a tip of an airfoil of a gas turbine engine component.
Figure 4:
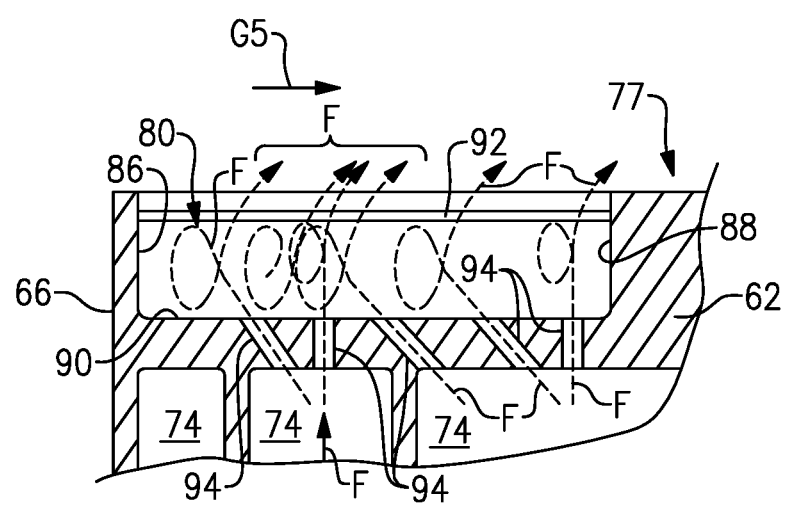
FIG. 4 illustrates a cross-sectional view through section A-A of FIG. 3.
Figure 5:
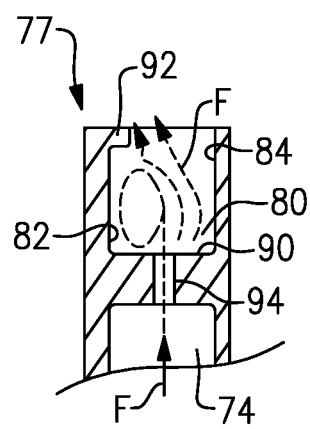
FIG. 5 illustrates a cross-sectional view through section B-B of FIG. 3.

FIGS. 3, 4 and 5 illustrate an exemplary tip 77 of an airfoil 62. A tip pocket 80 is formed within the tip 77. A cooling fluid F may be directed into the tip pocket 80 to cool the tip 77.

The tip pocket 80 terminates prior to, or upstream from, the trailing edge 68 of the airfoil 62. In one embodiment, the tip pocket 80 extends from a position near the leading edge 66 of the airfoil 62 to a position near a mid-span M of the airfoil 62 (see FIG. 3). However, the axial, circumferential and radial dimensions of the tip pocket 80 may vary within the scope of this disclosure.

The tip pocket 80 may include a suction side lip 82, a pressure side lip 84, a leading edge lip 86 and a trailing edge lip 88. The suction side lip 82, the pressure side lip 84, the leading edge lip 86 and the trailing edge lip 88 extend radially outwardly from a floor 90 of the tip pocket 80.

The tip pocket 80 may include one or more heat transfer augmentation devices 92. In one non-limiting embodiment, the heat transfer augmentation device 92 is a trip strip. However, other augmentation devices are also contemplated as being within the scope of this disclosure (see, for example, FIGS. 18 and 19).

In one embodiment, the heat transfer augmentation device 92 axially extends across the suction side lip 82 of the tip pocket 80 between the leading edge lip 86 and the trailing edge lip 88. However, other configurations are also contemplated. For example, the pressure side lip 84 could alternatively or additionally include a heat transfer augmentation device 92.

As best illustrated in the cross-sectional views of FIGS. 4 and 5, cooling holes 94 may extend through the floor 90 of the tip pocket 80 to fluidly connect the tip pocket 80 with one or more internal cooling cavities 74 that are formed inside the airfoil 62. The cooling holes 94 may communicate a cooling fluid F from the internal cooling cavities 74 into the tip pocket 80. A portion of the cooling holes 94 may be angled relative to the floor 90 and the internal cooling cavities 74.

The heat transfer augmentation device(s) 92 are adapted to temporarily trap the cooling fluid F inside the tip pocket 80. For example, the heat transfer augmentation device(s) 92 may temporarily block the cooling fluid F prior to its ejection into a gas stream GS (see FIG. 4). In addition, some of the cooling fluid F may ricochet back toward the floor 90 after contacting the heat transfer augmentation device(s) 92, thereby increasing the amount of time the cooling fluid F stays within the tip pocket 80. The heat transfer augmentation device(s) 92 also augment the heat transfer of the cooling fluid F in the tip pocket 80.

This disclosure is not intended to be limited to the exact configuration of the tip pocket 80 of FIGS. 3-5. Indeed, FIGS. 6-20 illustrate various other non-limiting embodiments of an airfoil tip pocket for a gas turbine engine component.

FIGS. 6, 7 and 8 illustrate another tip 177 of an airfoil 162. In this disclosure, like reference numbers designate like elements where appropriate and reference numerals with the addition of 100 or multiples thereof designate modified elements that are understood to incorporate the same features and benefits of the corresponding original elements. A tip pocket 180 is formed at the tip 177 and includes multiple heat transfer augmentation devices 192.

In this embodiment, the heat transfer augmentation devices 192 are formed on both a suction side lip 182 and a pressure side lip 184 of the tip pocket 180 and may extend radially outwardly from a floor 190 of the tip pocket 180. In other words, the heat transfer augmentation devices 192 of this embodiment extend vertically. The heat transfer augmentation devices 192 may extend to the same height as the suction side lip 182 and the pressure side lip 184, in one embodiment.

A plurality of cooling holes 194 extend through the floor 190 of the tip pocket 180. The cooling holes 194 may be positioned along a central axis CA of the tip pocket 180 (see FIG. 6) or could be offset from the central axis (see FIGS. 21 and 24). Each heat transfer augmentation device 192 may include a wall 195 that faces toward the cooling holes 194. In one embodiment, the walls 195 terminate prior to intersecting the central axis CA. Put another way, the thickness of each heat transfer augmentation device 192 does not extend beyond the cooling holes 194.

FIGS. 9, 10, 11, 12, 13 and 14 illustrate another tip 277 of an airfoil 262. A tip pocket 280 is formed at the tip 277 and includes multiple heat transfer augmentation devices 292. In this embodiment, the heat transfer augmentation devices 292 are formed on both a suction side lip 282 and a pressure side lip 284 of the tip pocket 280 and may extend radially outwardly from a floor 290 of the tip pocket 280. The heat transfer augmentation devices 292 may be slanted toward either a leading edge lip 286 of the tip pocket 280 (see FIGS. 9-11) or a trailing edge lip 288 of the tip pocket 280 (see FIGS. 12-14). In one non-limiting embodiment, the heat transfer augmentation devices 292 are slanted at about a 45° angle relative to the floor 290. Of course, other slant angles are also contemplated.

FIGS. 15, 16 and 17 illustrate yet another tip 377 of an airfoil 362. A tip pocket 380 is formed at the tip 377 and includes a plurality of heat transfer augmentation devices 392. In this embodiment, the heat transfer augmentation devices 392 are formed on a floor 390 of the tip pocket 380. The heat transfer augmentation devices 392 help mitigate aftward flow of the cooling fluid F and increase surface area of the tip pocket 380.

The heat transfer augmentation devices 392 may extend from a suction side lip 382 to a pressure side lip 384 of the tip pocket 380. That is, the heat transfer augmentation devices 392 may span an entire distance between the suction side lip 382 and the pressure side lip 384.

In one embodiment, the heat transfer augmentation devices 392 are tapered. For example, as best illustrated in FIG. 17, the heat transfer augmentation devices 392 may taper toward a central axis CA of the tip pocket 380. This taper may simplify the casting of the heat transfer augmentation devices 392 within the tip pocket 380.

Figure 18:
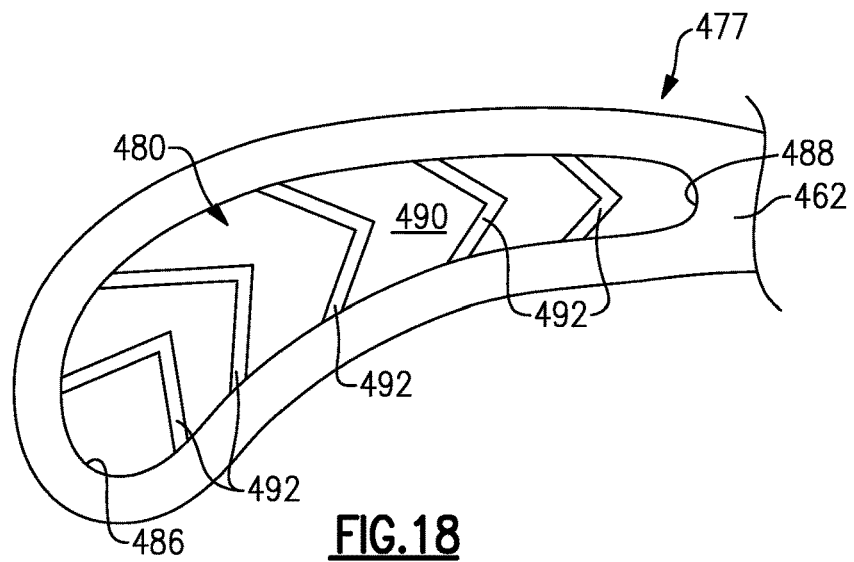
FIG. 18 illustrates an airfoil tip according to another embodiment of this disclosure.
Figure 19:
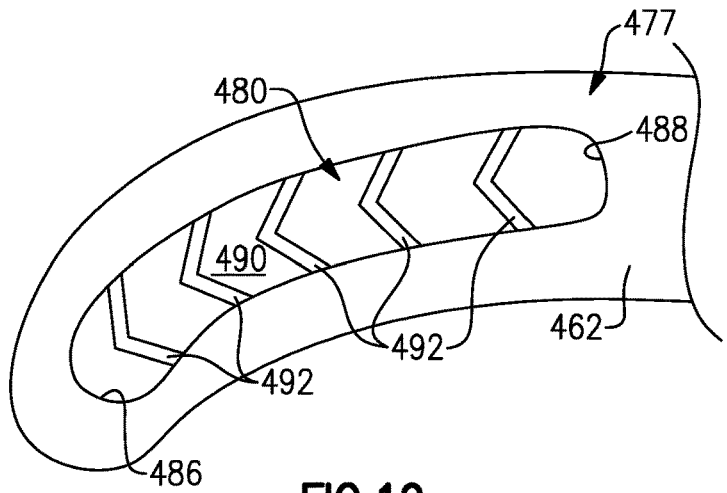
FIG. 19 illustrates another airfoil tip.

FIGS. 18 and 19 illustrate yet another tip 477 of an airfoil 462. A tip pocket 480 is formed at the tip 477 and includes a plurality of heat transfer augmentation devices 492. Like the embodiment of FIGS. 15-17, the heat transfer augmentation devices 492 are formed on a floor 490 of the tip pocket 480. However, rather than a trip strip configuration, the heat transfer augmentation devices 492 of this embodiment are chevrons. The heat transfer augmentation devices 492 may point toward a leading edge lip 486 (see FIG. 19) or a trailing edge lip 488 (see FIG. 18) of the tip pocket 480.

Figure 20:
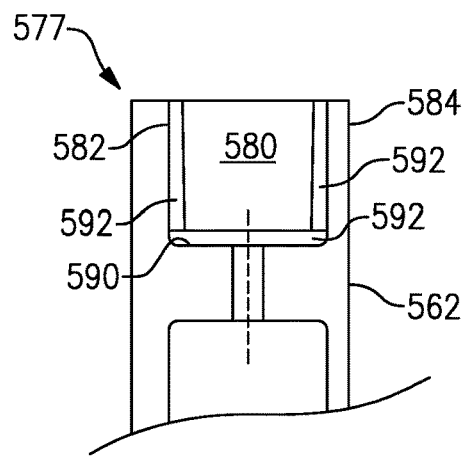
FIG. 20 illustrates a tip of an airfoil of a gas turbine engine component according to yet another embodiment of this disclosure.

Yet another tip pocket 580 is illustrated by FIG. 20. The tip pocket 580 is disposed at a tip 577 of an airfoil 562. In this embodiment, the tip pocket 580 includes a plurality of heat transfer augmentation devices 592 that are disposed at each of a floor 590, a suction side lip 582 and a pressure side lip 584 of the tip pocket 580.

FIGS. 21, 22 and 23 illustrate another tip 677 of an airfoil 662. A tip pocket 680 is formed at the tip 677 and may include one or more heat transfer augmentation devices 692. In one embodiment, the heat transfer augmentation device 692 helps mitigate aftward flow of the cooling fluid F and increases surface area of the tip pocket 680.

The heat transfer augmentation device 692 may extend at any angle between a suction side lip 682 and a pressure side lip 684 of the tip pocket 680. In one embodiment, the heat transfer augmentation device 692 is formed by a stepped portion of a floor 690 of the tip pocket 680. For example, the heat transfer augmentation device 692 may include a ramp 691 that extends between a first portion 693 and a second portion 695 of the floor 690. The first portion 693 and the second portion 695 of the floor 690 are radially offset from one another. In other words, the first portion 693 and the second portion 695 of the floor 690 extend in different planes.

Yet another tip pocket 780 is illustrated by FIG. 24. The tip pocket 780 is disposed at a tip 777 of an airfoil 762. In this embodiment, the tip pocket 780 includes heat transfer augmentation devices 792 that extend from a suction side lip 782 and a pressure side lip 784 of the tip pocket 780. Cooling holes 794 may extend through a floor 790 of the tip pocket 780 to fluidly connect the tip pocket 780 with an internal cooling cavity 774. The cooling holes 794 may communicate a cooling fluid F from the internal cooling cavity 774 into the tip pocket 780. Cooling hole portions P1 and P2 of the cooling holes 794 may be angled relative to the floor 790 and the internal cooling cavity 774. In one embodiment, the angled cooling holes 794 are angled at a relatively shallow angle α. Cooling holes of such a shallow angle cannot typically be cast or drilled into the tip pocket 780. However, these angled cooling holes 794 can be manufactured by using an additive manufacturing process.

The tip wall configurations of FIGS. 3-24 are intended as non-limiting embodiments only. Any configuration shown by these Figures may be used in combination with a configuration of any other Figure to create a desired tip cooling effect. In all embodiments, the heat transfer augmentation devices increase the amount of time the cooling fluid is maintained within the tip pocket and augment the heat transfer of the cooling fluid.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine comprising:
    an airfoil extending in a chordwise direction between a leading edge and a trailing edge and in a thickness direction between a pressure sidewall and a suction sidewall that meet together at both the leading edge and the trailing edge, the airfoil extending in a radial direction from a platform to a tip;
    a tip pocket formed in the tip and terminating prior to the trailing edge;
    wherein the tip pocket includes a suction side lip, a pressure side lip, a leading edge lip and a trailing edge lip that each extend outwardly in the radial direction from a floor to the tip;
    one or more heat transfer augmentation devices formed in the tip pocket, the one or more heat transfer augmentation devices including at least one rib along the floor extending in a circumferential direction between the suction side lip and the pressure side lip such that the at least one rib is spaced apart from the tip at the pressure and suction side lips, and the at least one rib extending from at least one of the suction side lip and the pressure side lip; and
    a plurality of cooling holes defined in the floor that fluidly connect the tip pocket to at least one internal cooling cavity formed inside the airfoil.

2. The component as recited in claim 1, wherein the airfoil is a rotatable turbine blade.

3. The component as recited in claim 2, wherein the at least one rib includes a plurality of ribs distributed along the floor.

4. The component as recited in claim 3, wherein the plurality of cooling holes includes a first cooling hole defined in the floor at a position between the leading edge lip and a forwardmost one of the plurality of ribs.

5. The component as recited in claim 3, wherein each rib of the plurality of ribs is a chevron pointing towards the leading edge lip or the trailing edge lip.

6. The component as recited in claim 3, wherein each rib of the plurality of ribs is dimensioned to taper towards a central axis of the tip pocket to establish a valley.

7. The component as recited in claim 6, wherein the plurality of cooling holes are distributed along the central axis.

8. A component for a gas turbine engine comprising:
    an airfoil extending in a chordwise direction between a leading edge and a trailing edge and in a thickness direction between a pressure sidewall and a suction sidewall that meet together at both the leading edge and the trailing edge, the airfoil extending in a radial direction from a platform to a tip;
    a tip pocket formed in the tip and terminating prior to the trailing edge;
    wherein the tip pocket includes a suction side lip, a pressure side lip, a leading edge lip and a trailing edge lip that each extend outwardly in the radial direction from a floor to the tip;
    one or more heat transfer augmentation devices formed in the tip pocket, the one or more heat transfer augmentation devices including at least one rib along the floor extending in a circumferential direction between the suction side lip and the pressure side lip such that the at least one rib is spaced apart from the tip at the pressure and suction side lips;
    a plurality of cooling holes defined in the floor that fluidly connect the tip pocket to at least one internal cooling cavity formed inside the airfoil; and
    wherein the at least one rib includes a plurality of ribs distributed along the floor, and each rib of the plurality of ribs spans an entire distance between the suction side lip and the pressure side lip.

9. The component as recited in claim 8, wherein the plurality of cooling holes includes a first cooling hole defined in the floor at a position between the leading edge lip and a forwardmost one of the plurality of ribs.

10. The component as recited in claim 9, wherein the first cooling hole is angled relative to the floor.

11. The component as recited in claim 8, wherein each rib of the plurality of ribs is a trip strip.

12. The component as recited in claim 8, wherein each rib of the plurality of ribs is a chevron pointing towards the leading edge lip or the trailing edge lip.

13. The component as recited in claim 12, wherein the chevron points towards the leading edge lip.

14. The component as recited in claim 12, wherein the chevron points towards the trailing edge lip.

15. The component as recited in claim 8, wherein the airfoil is a rotatable turbine blade.

16. The component as recited in claim 8, wherein each rib of the plurality of ribs is dimensioned to taper towards a central axis of the tip pocket to establish a valley.

17. The component as recited in claim 16, wherein the plurality of cooling holes are distributed along the central axis.

18. The component as recited in claim 16, wherein the valley is aligned with the central axis relative to the circumferential direction.

19. A component for a gas turbine engine comprising:

an airfoil extending in a chordwise direction between a leading edge and a trailing edge and in a thickness direction between a pressure sidewall and a suction sidewall that meet together at both the leading edge and the trailing edge, the airfoil extending in a radial direction from a platform to a tip;

a tip pocket formed in the tip and terminating prior to the trailing edge;

wherein the tip pocket includes a suction side lip, a pressure side lip, a leading edge lip and a trailing edge lip that each extend outwardly in the radial direction from a floor to the tip;

one or more heat transfer augmentation devices formed in the tip pocket, the one or more heat transfer augmentation devices including at least one rib along the floor extending in a circumferential direction between the suction side lip and the pressure side lip such that the at least one rib is spaced apart from the tip at the pressure and suction side lips;

a plurality of cooling holes defined in the floor that fluidly connect the tip pocket to at least one internal cooling cavity formed inside the airfoil; and wherein the one or more heat transfer augmentation devices includes a first heat transfer augmentation device and a second heat transfer augmentation device interconnected by the at least one rib, and the first and second heat transfer augmentation devices extend in the radial direction from the at least one rib to respective ones of the suction side lip and the pressure side lip.

20. The component as recited in claim 19, wherein the airfoil is a rotatable turbine blade.

* * * * *